No. 657,386. Patented Sept. 4, 1900.
A. A. BEVIN & P. C. ARNOLD.
BELL.
(Application filed Apr. 6, 1900.)
(No Model.)
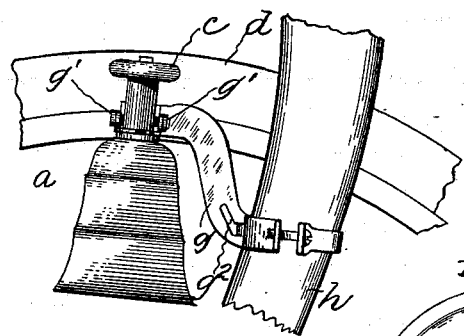
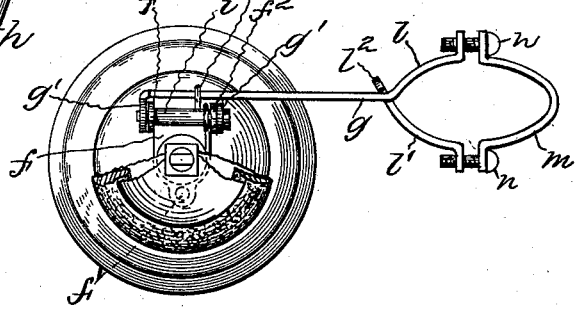
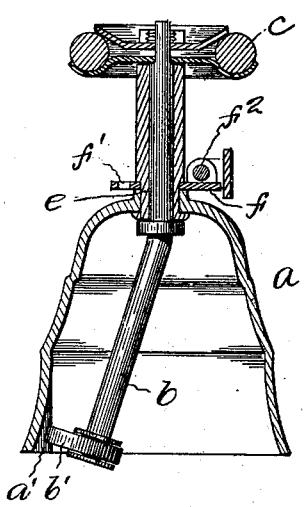
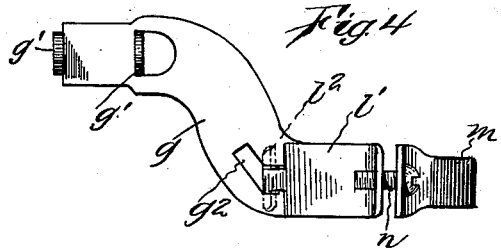
Witnesses:
W<sup>m</sup> H. Barker
Arthur B. Jenkins
Inventors
Abner A. Bevin
Philip C. Arnold
by Chas. L. Burdett
Attorney

UNITED STATES PATENT OFFICE.

ABNER A. BEVIN AND PHILIP C. ARNOLD, OF EAST HAMPTON, CONNECTICUT, ASSIGNORS TO THE BEVIN BROTHERS MANUFACTURING COMPANY, OF SAME PLACE.

BELL.

SPECIFICATION forming part of Letters Patent No. 657,386, dated September 4, 1900.

Application filed April 6, 1900. Serial No. 11,908. (No model.)

*To all whom it may concern:*

Be it known that we, ABNER A. BEVIN and PHILIP C. ARNOLD, citizens of the United States, and residents of East Hampton, in the county of Middlesex and State of Connecticut, have invented a new and useful Improvement in Bells, of which the following is a specification.

Our invention relates to the class of bells used on vehicles and operated by contact of a part, as with the tire of the wheel, with a moving vehicle; and the object of our invention is to provide a device of this class that shall be extremely simple in construction and effective in operation.

A device by means of which our improvement may be carried out is illustrated in the accompanying drawings, in which—

Figure 1 is a side view of the bell and bracket shown in place on the fork of a bicycle, a portion of the fork only being shown. Fig. 2 is a top view of the bell and bracket with parts cut away to show construction. Fig. 3 is a detail view in lengthwise section through the bell. Fig. 4 is a side view of the bracket.

In the accompanying drawings the letter $a$ denotes the bell, that is preferably formed after the shape of the hand-bells in common use. An opening is formed through the top of this bell, and a rotating striker-arm $b$ extends through this opening and supports on its inner end a striker $b'$, adapted in the rotation of the striker-arm to hit a lug $a'$, formed on the inner wall of the gong. This striker may be supported at the end of the striker-arm in any suitable or convenient manner, it not being essential that the striker-arm shall be bent as herein shown, although it is preferred to so construct it, and that it shall be rigid, the striker having a sliding movement to cause it to be thrown away from the lug as it strikes it in the rotary movement of the striker-arm. A roller $c$ is secured to the outer end of the striker-arm and is properly constructed to make contact with the rim or tire $d$ of a wheel of a bicycle or like vehicle. A sleeve $e$ is secured to the upper end of the bell, preferably by means which include a reduced portion of the sleeve passing through the opening in the bell and secured, as by means of riveting at its inner end. The striker-arm $b$ has its bearing in this sleeve. A plate $f$ is supported on the reduced portion of the sleeve and is located between the shoulder on the sleeve and the end of the bell. This plate has on one side of the sleeve an opening $f'$, to which a cord or like part may be attached, and on the opposite side of the sleeve ears $f^2$, turned at an angle to the plane of the plate. A bracket $g$ is adapted to be secured to the fork $h$, as of a bicycle, this bracket having at its outer end outturned ears $g'$, preferably formed at an angle to the plane of the bracket. Openings are formed through the ears on the plate and on the bracket, and a pivot $i$ passes through these openings and serves as a means for pivotally supporting the bell on the bracket. A spring $k$ passes around the pivot, with one end passing over the edge of the bracket and the opposite end pressing against the upper surface of the plate $f$. This spring serves to hold the bell in its normal position, with the roller $c$ out of contact with the rim or tire of a wheel. The inner end of the bracket is provided with branches which are formed to the shape of the part to which the bracket is to be attached. One of these branches $l$ is preferably formed integral with the bracket $g$. The other branch $l'$ is preferably formed of a separate piece having a T-shaped end $l^2$. This end is adapted to pass through a slot $g^2$ in the bracket, which slot is formed of a width equal to the thickness of the branch $l'$. The slot $g^2$ is so formed that when the branch $l'$ is in proper position for attachment of the device the T-shaped end will lie crosswise of the slot and prevent disengagement of the parts. A yoke $m$ is adapted to be secured to the branches $l\ l'$, as by means of screws $n$, this yoke being formed to the approximate shape of the part to which the bracket is to be secured and is adapted to lie on the opposite side of said part from that on which the branches $l\ l'$ are located.

It is obvious that other means than those herein shown and described for forming the hinge or pivotal connection between the bracket and the bell may be employed and yet come within the scope of the invention, and we do not wish to limit ourselves to the exact form herein shown and described of the means of attaching the bracket to its support, as this may be departed from to a considerable extent and yet come within the scope of the invention.

What we claim as our invention, and desire to secure by Letters Patent, is—

1. In a bell, in combination, a bracket adapted to be secured to the frame of a bicycle or the like and extending in a direction substantially parallel with the plane of the wheel adapted to sound the gong, ears extending from said bracket in a direction at right angles thereto, a plate secured to the gong and having ears formed to coöperate with the ears on the bracket, a pivot extending through the ears on the bracket and plate, and a striker-arm mounted in the gong and extending in the direction of the axis thereof and having a striker on one end and a roller on the opposite end adapted to make contact with the rim of a wheel.

2. In a bell, in combination with the gong, a sleeve secured within an opening in the gong, a striker-arm rotatively mounted in the sleeve, a striker loosely mounted on the arm, a roller secured to the arm, a plate secured between a shoulder on the sleeve and the end of the gong and having a pivotal connection with a bracket, the bracket, and means for securing the bracket to the support.

3. An attachment for securing a bracket in place consisting of the body part of the bracket bent at its outer end and having a slot, a branch formed in opposition to the bent end of the bracket and having a T-shaped end adapted to engage said slot, and a yoke formed in opposition to the bent end of the bracket and branch and adapted to be secured to said parts.

4. In a bell, in combination with the gong, a sleeve secured in the end of the gong, a plate located between a shoulder on the sleeve and the end of the gong and provided with ears, a striker-arm mounted in said sleeve, a striker loosely borne on the arm, a roller secured to the arm, a bracket having ears, a pivot passing through the ears on the bracket and plate, and means for securing the bracket in position.

ABNER A. BEVIN.
PHILIP C. ARNOLD.

Witnesses:
ARTHUR W. MEAD,
CHAS. E. REYNOLDS.